July 31, 1962 S. L. HUSTON 3,047,038
TIRE CHAINS
Filed Feb. 20, 1961
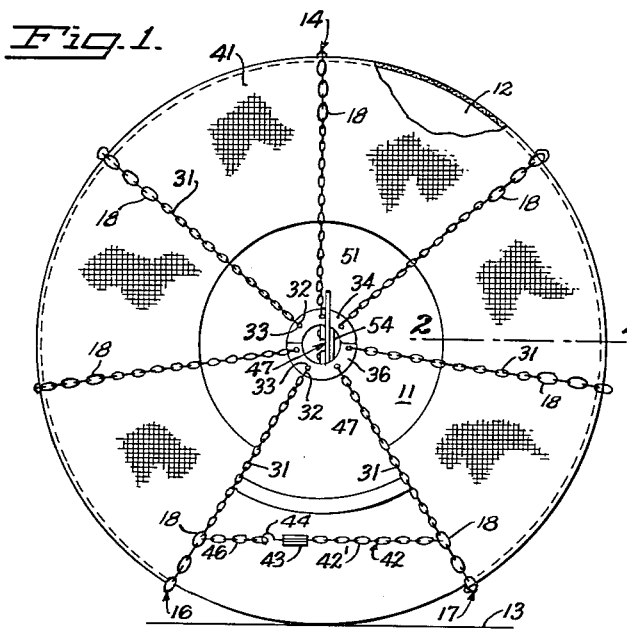
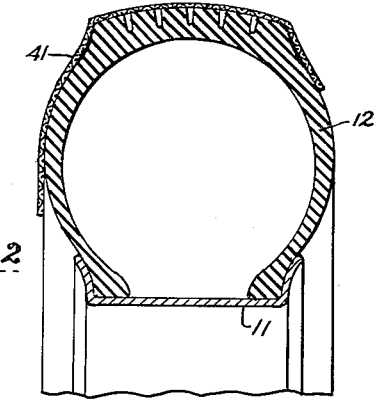
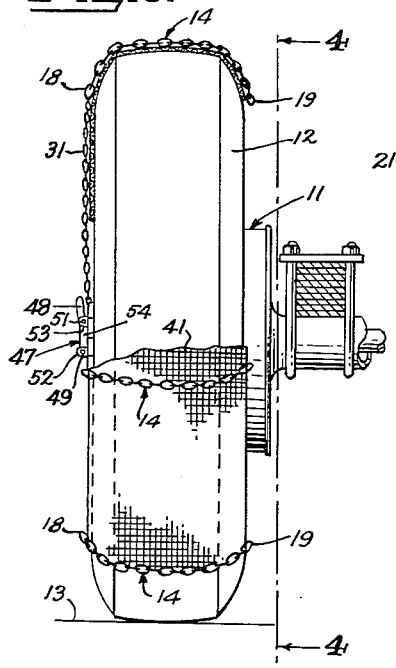
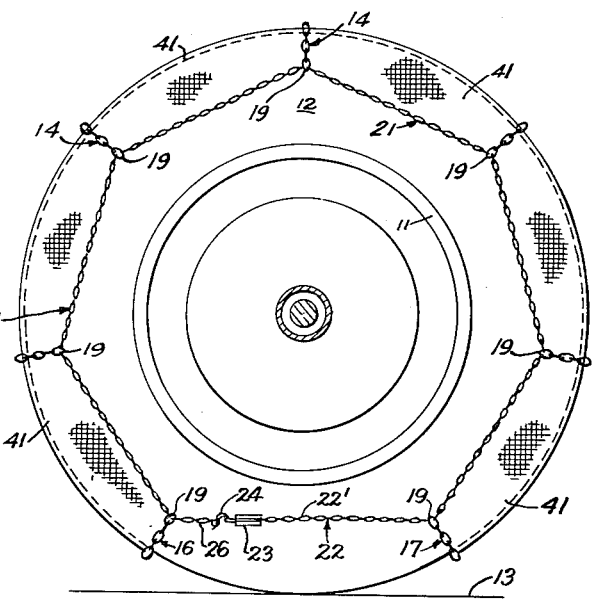
INVENTOR.
SHELBY L. HUSTON
BY
ATTORNEY United States Patent Office 3,047,038
Patented July 31, 1962

3,047,038
TIRE CHAINS
Shelby L. Huston, 1451B Hayes St., San Francisco, Calif.
Filed Feb. 20, 1961, Ser. No. 90,278
6 Claims. (Cl. 152—241)

The invention, in general, relates to anti-skid devices removably mounted on the wheel tires of an automotive vehicle. More particularly, the invention relates to anti-skid chains embodying means for yieldably retaining the same on the tires under all conditions of travel.

There have been appreciable efforts heretofore in the art to devise tire chains which not only would be effective in preventing the skidding of a vehicle while being operated under hazardous slippery road conditions, but also which would not damage the tires on which they are mounted and would not have to be frequently re-mounted on the tires during travel. Further, efforts have been made to devise such anti-skid devices which can be installed without jacking the vehicle or moving the same onto the chains for effecting the mounting thereof on the wheels. Some success has been had in the attainment of the foregoing objects but many of the prior devices have been appreciably expensive to manufacture; many are cumbersome and complex to install; many of the prior devices require drilling of holes in wheel hubs in order to install; and many such devices are otherwise disadvantageous because they do not remain on the tires and require frequent remounting while other types require jacking or backing of the vehicle onto the chains to effect installation thereof. The present invention is directed to the provision of improved tire chains embodying chain retention means which obviate all of the disadvantages of prior art devices of this type and which can be manufactured at a relatively low cost.

A primary object of the present invention is to provide improved tire chains which can be installed upon the wheel tires of an automotive vehicle with facility without jacking of the vehicle or without backing the same onto the tire chains during the installation thereof.

Another important object of the invention is to provide improved tire chains of the indicated nature which are additionally characterized by their capability of being readily installed by any person, skilled or unskilled, while the car is at rest and without jacking the vehicle for any phase of the installation.

A still further object of my present invention is to provide improved tire chains of the aforementioned character and which embody means for retaining the chains in yieldably mounted position during all travel conditions and without damaging the tires on which they are mounted.

Other objects of the invention, together with some of the advantageous features thereof, will appear from the following description of a preferred embodiment of the present invention which is illustrated in the accompanying drawings. It is to be understood, however, that I am not to be limited to the precise embodiment shown, nor to the precise arrangement of the various components thereof, as my invention, as defined in the appended claims, can be embodied in a plurality and variety of forms.

Referring to the drawings:

FIG. 1 is a front elevational view of a preferred embodiment of the invention as installed upon a wheel tire, partly broken away to illustrate the construction.

FIG. 2 is an enlarged fragmentary detail illustrating a wire mesh web applied to a tire.

FIG. 3 is an end elevational view of the wire mesh member of a preferred embodiment of the invention installed on a rear wheel of an automotive vehicle.

FIG. 4 is an inside view of a vehicle wheel carrying a preferred embodiment of the present invention; this view being taken in a direction indicated by the arrows and numerals 4—4 of FIG. 3.

In its preferred form, the tire chains of my present invention for removable mounting upon the tires of automotive vehicle wheels while at rest preferably comprises an assembly consisting of a series of road-gripping link elements arranged transversely of and in spaced relationship circumferentially about a tire except that portion of a tire engaging a surface; each of said link elements having an outer extremity presented to the outside of a wheel and inner extremity presented to the inside of a wheel, a circumferentially extending link chain connected at spaced intervals to the inner extremities of said road-gripping link elements around the inner side of the tire and presenting opposed ends adjacent to that part of the tire engaging a surface, together with a first adjustable tightener for connecting the opposed ends of said link chain together on the inside of the wheel, a second adjustable tensioner for connecting together on the outside of the wheel the outer extremities of those opposed road-gripping link elements adjacent to a surface on which a tire is at rest, a plurality of radially arranged flexible members each connected at an outer end to an outer extremity of a road-gripping link element, flexible webs connected to and between said radially arranged flexible members for constraining the same against displacement, means yieldably holding the inner ends of said radially arranged flexible members, and clamping means for tightening and retaining the entire assembly on a tire.

As illustrated particularly in FIGS. 3 and 4 of the annexed drawings, where I have illustrated an automobile wheel 11 provided with a tire 12 at rest position on a surface 13, my improved tire chains assembly includes a plurality of road-gripping link elements 14 which are arranged transversely of the tire 12 and in spaced relationship circumferentially about the tire, as shown. This series of road-gripping link elements 14 are so arranged in the assembly that a pair of opposed link elements 16 and 17 of the plurality of road-gripping link elements 14 are presented adjacent to the surface 13 on which the tire rests and on opposite sides of a mid-circumferential plane of the wheel 11. These transversely disposed road-gripping link elements 14 may be of conventional construction in that they may comprise interlocking links with a terminal outer link 18 and an inner terminal link 19, taken in connection with the outer and the inner side of the vehicle wheel 11, on each of these transversely arranged road-gripping link elements. In accordance with the present invention, rather than providing two circumferentially extending link chains for holding the transverse or road-gripping link elements 14 together, I preferably employ in my tire chain assembly only a single circumferentially extending link chain, designated generally by the reference numeral 21 and extending on the inner side of the wheel 11. As shown specifically in FIG. 4 of the accompanying drawings, the link chain 21 is connected at spaced intervals with the inner terminal links 19 of the road-gripping link elements 14; the connections being either made by welding the link chain to these inner terminals or by interlocking the links of the link chains with the terminal inner links 19 of the road-gripping link elements 14.

As indicated, the opposite terminal extremities of the link chain 21 are connected to the inner terminal links 19 of the pair of opposed link elements 16 and 17 which are disposed on the tire 12 adjacent to the surface 13, as above mentioned. To complete the assembly as to the inner side of the wheel 11, I provide a first adjustable tensioner 22 which preferably can consist of a link chain for a portion of its length and which includes a resilient or flexible element 23 connected to the linkage at its one end and connected to a hook element 24 at its other end for detachably engaging the tensioner 22 across the inner terminal links 19 of the pair of opposed link elements 16 and 17; the tensioner 22 consisting of the long chain link portion 22' and the short chain link 26 with the long portion connected at its one end to the inner terminal link 19 of the link element 17 and its other end connected to the flexible or resilient element 23 carrying the hook 24 while the short chain link 26 is connected at its one end to the inner terminal link 19 of the link element 16. Thus, when it is desired to connect the aforementioned assembly together on the inner side of the wheel 11 it is only necessary for the vehicle operator to reach behind the wheel 11 and grasp the element 22 in his hands and connect the hook 24 into any one of the plurality of links defining the short linkage 26 forming a part of the tensioner 22.

On the outside of the wheel 11, my improved tire chain assembly preferably includes a plurality of radially arranged flexible members 31 which can consist of link chains, as shown, and which are connected at their outer ends to the outer terminal links 18 of the road-gripping link elements 14. As shown, the inner ends of the radially arranged flexible members 31 may be provided with short lengths of wire 32 for fastening the members 31 through the means of perforations 33 in opposed plates 34 and 36 which, when the assembly is in place upon the tire 12 are disposed centrally of the wheel 11, as illustrated. In general, approximately six of the radially arranged flexible members 31 are employed in each of my improved tire chain assembly and three of these flexible members are connected to the central plate 34 on what may be termed the upper half of the wheel 11 while the remaining three or four flexible members 31 are connected at their inner ends to the centrally disposed plate 36. The two plates 34 and 36 conveniently are formed in the shape of a semi-circle and complement one another so that when the assembly is tensioned about the tire 12 the two plates 34 and 36 are in opposed abutment with one another so that they are presented in a complete circle or ring. In other words, the completed ring is actually a split ring with one of the semi-circular elements or plates 34 constituting one-half of the split ring and the other element or semi-annulus 36 constituting the other half of the split-ring.

In order to prevent or constrain displacement of the radially arranged flexible members 31, as well as the plurality of road-gripping link elements 14 while the wheel 11 is in motion and under variable conditions of travel, I provide in my tire chain assembly a plurality of webs 41 constructed of wire mesh, as indicated, and connected to and between adjacent radially arranged flexible members 31 preferably by welding, not shown, or otherwise fastening the lateral extremities of the wire mesh webs 41 to the links of the radially arranged flexible members 31. It is to be especially observed, see FIGS. 3 and 4, that the wire mesh webs 41 extend not only between the radially arranged flexible members 31 on the outer side of the wheel 11 but also over the extent of the transversely arranged road-gripping elements 14 and are connected thereto at their lateral extremities as well as being connected to the link chain 21 in the same manner as being connected to the flexible members 31. Thus, the wire mesh extends in the form of pie-shaped webs 41 from approximately the center of the wheel on its outer side to the inner side of the wheel and over the top of the tire so that there is applied a series of forces between the radially arranged flexible members 31 and the road-gripping elements 14 as well as the link chain 21 which will constrain dislodgement of the assembly from the tire as well as displacement of any individual road-gripping link element 14 from its normal position as originally mounted on the tire. It is true, of course, that there will be some creeping of individual road-gripping elements 14 because of untoward road conditions but to a large extent any undue creeping of these road-gripping elements is prevented by the webs 41 above mentioned.

In accordance with my present improvement, my tire chain assembly also includes a second adjustable tensioner 42 for connection on the outer side of the wheel 11 when the tire chain assembly is initially installed upon any given tire. As the second adjustable tensioner is the same as the first adjustable tensioner, suffice is it to say that it consists of a flexible link chain designated generally by the reference numeral 42 and includes a resilient element 43 carrying a hook element 44 so as to provide a relatively long link chain 42' and a relatively short link chain 46. As shown, one terminal of the long link chain 42' is connected at its one end to the outer terminal link 18 of one of the pair of opposed link elements; namely, the link element 17, adjacent to the road or surface 13, and the inner end of the short link chain 46 of the adjustable tensioner 42 is connected to the outer terminal link 18 of the other of the pair of opposed link elements; namely the link element 16. It can be thus noted that the adjustable tensioner 42 can be grasped by the operator of the vehicle when installing the tire chain assembly and the hook 44 thereof can be looped through any selected one of the links of the short link chain 46 of this adjustable tensioner 42 in the same manner as the operator connects the first adjustable tensioner 22 on the inside of the wheel 11. It is also to be noted, in this connection, that there need be no wire mesh web 41 between the radially arranged adjustable or flexible members 31 at the lower side of the wheel 11 between the pair of opposed link elements 16 and 17, as shown in FIG. 1.

In order to tension the entire assembly upon a wheel tire of an automotive vehicle, I preferably provide clamping means, designated generally by the reference numeral 47, for bringing into abutting engagement the half-rings 34 and 36 and holding the same in abutting relationship in the form of a complete ring while the tire chain assembly is on the wheel 11. To this end, a lever 48 is pivotally mounted on pivot pins 49 and 51 supported in bosses 52 and 53, respectively, on the half-rings 36 and 34, respectively, with a link 54 of the lever assembly 47 extending through an opening in the half-ring 34. By pressing down upon the lever 48 after drawing the half-rings 34 and 36 together the lever acts as a clamp and a drawing element combined to hold the two half-rings 34 and 36 together and at the same time tension the flexible members 31 as well as the webs 41 and also the road gripping link elements 14 in operative position with the circumferentially extending link chain 21 tensioning the road-gripping link elements 14 on the inner side of the wheel 11. It is to be especially observed that in mounting my tire chain assembly on any given tire 12, it is only necessary to drape the upper portion of the assembly, including the link chain 21 on the inner side of the wheel, the road-gripping link elements 14 and the upper three flexible members 31 and the half-ring 34 to which they are connected, over the tire 12 and then fasten the first adjustable tensioner 22 in the manner above described to the inner terminal links 19 of the pair of opposed link elements 16 and 17 at the inner side and bottom of the wheel 11. Thereafter, the lower three or four adjustable flexible members 31 and the connected half-ring 36 are brought to a position adjacent the half-ring 34 with the link 54 passing through the opening in the half-ring 34 and the lever pulled down to a clamping position, after first having connected the second adjustable tensioner 42 to the outer terminal links 18 of the cross pair of opposed link elements 16 and 17 at the outer bottom side of the wheel 11.

The entire mounting of my improved tire chain assembly upon any given wheel can be accomplished without jacking the vehicle in any way whatsoever and with the wheel at rest; it being unnecessary to lay the assembly down on the ground as in other types of tire chains and roll the vehicle into a position on the chains. It is only necessary, as stated above, to drape the upper half of the tire chains assembly over the upper portion of the tire 12 and connect the first tensioner 22 on the inner side of the wheel at the lower portion thereof and thereafter bring up the outer portion of the assembly to a position where the half-rings 34 and 36 can be interlocked and clamped together and the second tensioner 42 fastened to connect the outer terminal rings 18 of the transversely arranged link elements 16 and 17 at the bottom of the wheel together at this point. The entire assembly or mounting of the tire chains of my improvement requires but a few minutes and can be accomplished by an unskilled person with as equal facility as a skilled person.

It is to be understood that the appended claims are to be accorded a range of equivalents commensurate in scope with the advances made over the prior art.

I claim:
1. A tire chain for removable mounting upon a wheel-mounted tire of a vehicle while at rest; said tire chain comprising a series of road-gripping link elements each adapted to extend transversely of the tire in separately spaced arrangement circumferentially of the tire and including a pair of link elements adapted to be supported on the tire in opposed relationship to one another; each of said separately spaced road-gripping link elements having an outer terminal link presented to the outside of the tire and having an inner terminal link presented to the inside of the tire, a link chain adapted to extend circumferentially about the inside of the tire and terminating in opposed longitudinal extremities; said link chain being connected to said inner terminal link of each of said road-gripping link elements, a first adjustable tensioner adapted to adjustably connect together said opposed longitudinal extremities of said link chain and said inner terminal links of said pair of link elements a second adjustable tensioner adapted to adjustably connect together said outer terminal links of said pair of link elements, a plurality of flexible members adapted to be anchored adjacent to a central area of the wheel in radial arrangement with respect thereto and each connected to an outer terminal link of said road-gripping link elements, and a flexible web connected to and between adjacently disposed flexible members of said plurality of flexible members and connected to and between adjacently disposed road-gripping link elements of said series of road-gripping link elements thereby to constrain displacement of said flexible members and said road-gripping link elements during movement of the tire over a surface.

2. In a tire chain, a series of road-gripping link elements each adapted to extend transversely of and separately in circumferentially spaced relationship about a tire and presenting a pair of opposed link elements; each separately spaced road-gripping link element having an outer terminal link presented to the outside of the tire and having an inner terminal link presented to the inside of the tire, a link chain adapted to extend circumferentially about the inside of the tire and terminating in opposed longitudinal extremities; said link chain being connected at spaced intervals thereof to said inner terminal links of said road-gripping link elements, a first adjustable tensioner adapted to adjustably connect together the longitudinal extremities of said link chain and the inner terminal links of said pair of opposed link elements on the inside of the tire, and a second adjustable tensioner adapted to adjustably connect together said outer terminal links of said pair of opposed link elements.

3. In a tire chain as defined in claim 2, and a plurality of flexible members adapted to be anchored adjacent to a central area of the tire and separately connected at their outer ends to the outer terminal links of each of said road-gripping link elements.

4. In a tire chain as defined in claim 2, and a plurality of flexible members adapted to be arranged radially with respect to the central area of the tire and connected at their outer ends to the outer terminal links of said plurality of road-gripping link elements, and clamping means connected to the inner ends of said flexible members adjacent to the central area of the tire on the outside thereof for tensioning said flexible members and thereby constraining displacement of said road-gripping link elements during movement of the tire over a surface.

5. A tire chain comprising a series of transversely disposable road-gripping link elements mountable on a tire and adapted to be arranged transversely thereof in spaced apart relationship to one another circumferentially about the tire, a link chain adapted to extend circumferentially about the tire on the inside thereof and connected to the inner links of the spaced apart transversely disposable road-gripping link elements, a plurality of radially arranged flexible members connected at their outer ends to the outer links of each of said road-gripping link elements, flexible webs connected to and between adjacent flexible members and connected to and between adjacent road-gripping link elements of said series of circumferentially arranged and spaced apart road-gripping link elements, and clamping means connected to the inner ends of said flexible members to retain the tire chain in operative position on a tire during its movement over a surface.

6. In a tire chain including a series of road-gripping link elements transversely disposable on a tire at spaced intervals about the same and containing a pair of opposed link elements, a link chain adapted to extend circumferentially of the tire on the inside thereof to provide opposed longitudinal extremities on said link chain adjacent to said pair of opposed link elements, means connecting said link chain at spaced intervals to said road-gripping elements, a first tensioner adapted to adjustably connect said opposed longitudinal extremities of said link chain together, radially arranged flexible members on the outside of the tire and connected at their outer ends to said road-gripping link elements, and a plurality of flexible webs connected to adjacently disposed road-gripping link elements and also connected to adjacently disposed radially arranged flexible members to constrain the tire chain against displacement.

References Cited in the file of this patent
UNITED STATES PATENTS

| 975,693 | Kingston et al. | Nov. 15, 1910 |
| 1,360,866 | Barniak | Nov. 30, 1920 |
| 1,423,202 | Fellows | July 18, 1922 |
| 2,742,940 | McKenne | Apr. 24, 1956 |
| 2,970,632 | Kuc | Feb. 7, 1961 |